United States Patent
Dolle et al.

(10) Patent No.: US 6,609,010 B1
(45) Date of Patent: Aug. 19, 2003

(54) DUAL FREQUENCY BAND TRANSCEIVER

(75) Inventors: Thomas Dolle, Stuttgart (DE); Veselin Brankovic, Fellbach (DE); Tino Konschak, Stuttgart (DE); Dragan Krupezevic, Stuttgart (DE)

(73) Assignee: Sony International (Europe) GmbH, Berlin (DE)

( * ) Notice: Subject to any disclaimer, the term of this patent is extended or adjusted under 35 U.S.C. 154(b) by 0 days.

(21) Appl. No.: 09/439,411

(22) Filed: Nov. 11, 1999

(30) Foreign Application Priority Data

Nov. 30, 1998 (EP) .............................. 98122677

(51) Int. Cl.[7] .............................. H04B 1/38; H04J 11/00
(52) U.S. Cl. ..................... 455/552; 455/553; 455/84; 370/208
(58) Field of Search ................................ 455/552, 553, 455/78, 84, 76, 73; 370/206, 208, 335, 465, 480; 375/219, 260, 261

(56) References Cited

U.S. PATENT DOCUMENTS

| | | | | |
|---|---|---|---|---|
| 5,537,398 A | * | 7/1996 | Siwiak ......................... | 370/19 |
| 5,564,076 A | * | 10/1996 | Auvray ....................... | 455/552 |
| 5,732,330 A | * | 3/1998 | Anderson et al. ........... | 455/552 |
| 5,784,418 A | * | 7/1998 | Sykes et al. ................. | 375/347 |
| 5,881,369 A | * | 3/1999 | Dean et al. .................... | 455/78 |
| 5,974,302 A | * | 10/1999 | Adamiecki et al. ........... | 455/84 |
| 6,097,974 A | * | 8/2000 | Camp, Jr. et al. ........... | 455/575 |

FOREIGN PATENT DOCUMENTS

| | | |
|---|---|---|
| EP | 0 689 308 | 12/1995 |
| EP | 0 851 598 | 7/1998 |

* cited by examiner

*Primary Examiner*—Vivian Chin
*Assistant Examiner*—Duc Nguyen
(74) *Attorney, Agent, or Firm*—Frommer Lawrence & Haug LLP; William S. Frommer; Dennis M. Smid

(57) ABSTRACT

A dual frequency band transceiver (10) is provided adapted to be operated into different transmission frequency bands. A control unit (8) controls a switching (6) between a first transmission frequency band $F_{C1}$ and a second transmission frequency band $F_{C2}$, wherein the control unit (8) changes correspondingly and simultaneously to the switching (6) in the first transmission frequency band $F_{C1}$ and the second transmission frequency band $F_{C2}$ between a first and a second channel bandwidth.

The first and the second channel bandwidth satisfies the following equation:

$$n*B_{C1}=m*B_{C2},$$

wherein $B_{C1}$ and $B_{C2}$ are the first and the second channel bandwidth, respectively, and n and m are an integer values starting with 1.

19 Claims, 3 Drawing Sheets

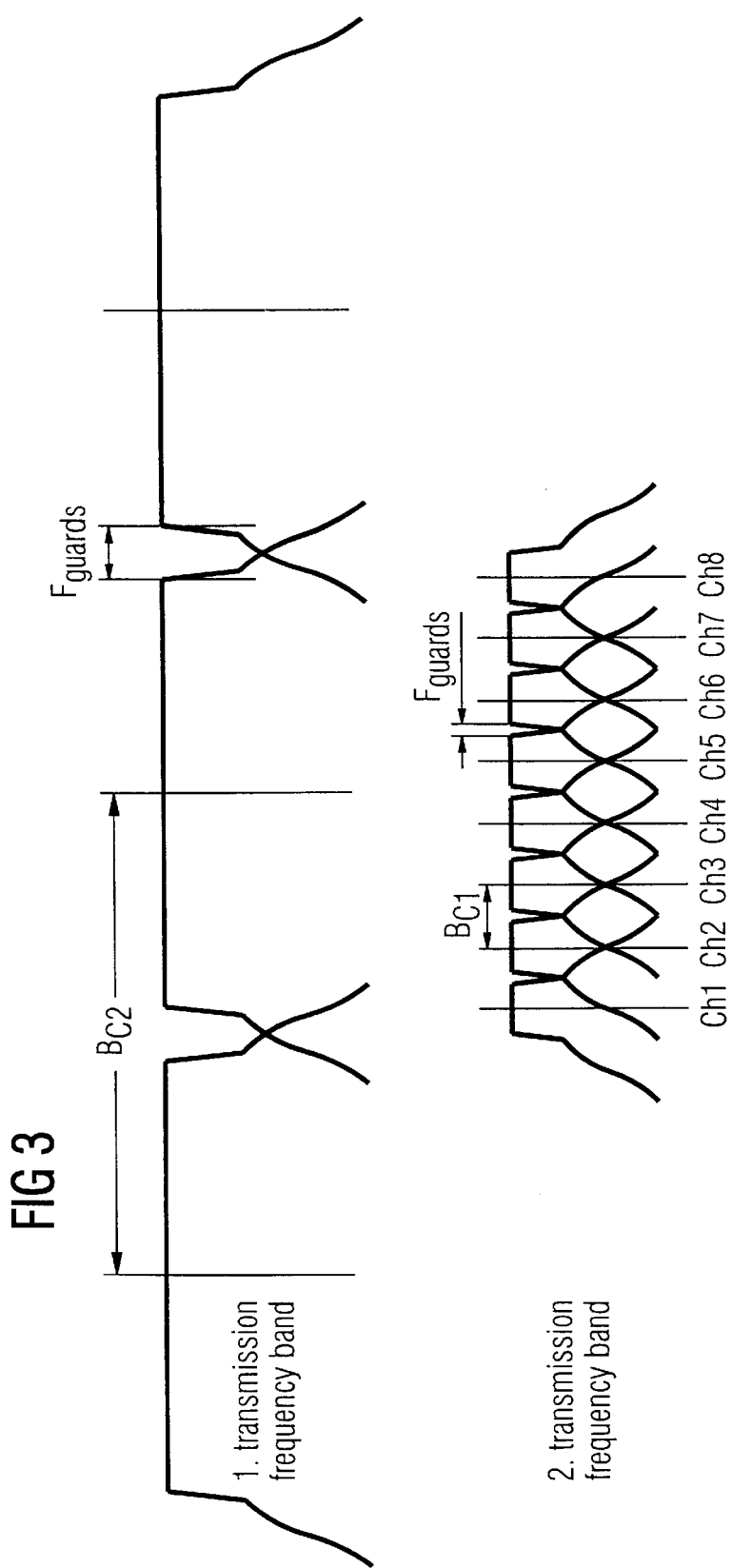

DUAL FREQUENCY BAND TRANSCEIVER

BACKGROUND OF THE INVENTION

The present invention relates to a dual frequency band transceiver technique particularly adapted for example for a channel mapping solution of dual band OFDM systems.

Wireless communications systems that are currently in development and future generations of wireless systems are targeting high data rate applications. Therefore the utilization of frequency bands in the microwave range and in the mm wave range has been gaining a lot of interest for the recent years. Private (non-licensed) frequency bands of operation offer a wide variety for prosper commercial applications. There are bands available in the frequency range of about 800 MHz, 2.4 GHz, 5–6 GHz, about 10 GHz, 24 GHz and 59–64 GHz, which can be considered more or less as license free frequency bands or ISM (industrial, scientific, medical) bands. These bands usually have power level limitations.

Generally, the different frequency bands can be classified due to different propagation properties in:
a) NLOS (non-line of sight) and LOS (line of sight) communication, and
b) predominantly only LOS (line of sight) communication.

Due to the increased free space attenuation and decreased wall penetration, wireless communication systems operating at higher frequencies (usually greater than 10 GHz) have in general a very limited coverage range. That means a satisfactory communication is only possible in a LOS or highly reflecting short-range scenario. On the other hand operating in the higher frequency ranges gives the advantage to use more frequency resources, which is necessary for wireless broadband applications, and simultaneously the higher frequency range provide for very good channel conditions. Possible applications therefore are professional high quality video transmission in wireless TV studios, high-resolution image transfer in hospitals or general offices and home applications as for example wireless LAN or wireless home network.

All these applications are distinguished by their requirements as mobility, coverage range and data throughput. Therefore generally there is a need for a receiver technique adapted for transmission in at least two different bands, where for example one of the frequency transmission bands should provide for a NLOS transmission and the other one should provide for a LOS transmission. There is also a need for a interoperability with coexisting systems operating in different transmission frequency bands.

In the state of the art, dual band transmission techniques are known. However, according to these known techniques the difference between the two frequency bands is hardly larger than 20% of the central frequency and in the most cases the difference is even less than 5%.

U.S. Pat. No. 5,564,076 discloses a dual mode portable digital radio transceiver for communication via a terrestrial network (first mode) and via a satellite network (second mode) synthesizing a modulation first frequency for modulation of signals transmitted in both modes and a conversion second frequency for demodulation of signals received in the two modes. This known transceiver divides the converted second frequency supplying a conversion third frequency for demodulation of signals received in one of the modes using a signal receive frequency band far away from the other frequency bands used. In the case of transmission the same means transmitting both modes with no duplication of components. Only demodulation frequencies supplied by an oscillator is adjusted to the specific frequency of the transmission mode in use.

GB-A-2 173 660 discloses a paging receiver including a superheterodyne circuit with a mixer for mixing a first frequency received signal from an antenna with a signal from a local oscillator. An intermediate frequency signal of the paging receiver appears at the output of the mixer and either this signal or a second received signal from another antenna at the same frequency as the intermediate frequency signal is further amplified and decoded depending on the setting of a switch. The switch can be automatically responsive to an area wide transmission by causing the on-site reception to be disabled by the operation of an out-of-range warning circuit.

From U.S. Pat. No. 5,640,694 an integrated RF system with segmented frequency conversion is known.

GB-A-2 312 107 discloses a multi-band receiver and quadrature demodulator with selectable local oscillator. Thereby a receiver may receive one of two bands depending on the position of a switch. This intermediate frequency switch is responsive to a switching control signal indicative of which radio frequency bands the corresponding mobile unit is operating for outputting a first intermediate frequency signal corresponding to a first mobile communication system and outputting a second intermediate frequency signal corresponding to another communication system.

EP-A-633 705 discloses a multi-band cellular radio-telephone system architecture. This dual frequency cellular radio-telephone system has different service providers and serving mobile subscribers at first and second distinct frequency ranges, and using frequency conversion techniques to serve both frequency ranges.

However, all these known dual band transceiver are not adapted to a transmission system according to an OFDM Orthogonal Frequency Division Multiplexing technique.

Therefore it is the object of the present invention to provide for a dual band transceiving technique allowing a transmission in two different transmission frequency bands, wherein the technique should be particularly well adapted for a transmission according to OFDM techniques.

The above object is achieved by means of the features of the independent claims. The dependent claims develop further from the central idea of the present invention.

According to the present invention therefore a dual frequency band transceiver is provided adapted to be operated in two different transmission frequency bands, wherein the dual frequency band transceiver comprises a control unit controlling a switching between the first transmission frequency band and a second transmission frequency band, wherein the control unit is adapted to change between a first and a second channel bandwidth correspondingly and simultaneously to the switching between the first transmission frequency band and the second transmission frequency band.

The first and the second channel bandwidth thereby are set to satisfy the following equation:

$$n*B_{C1}=m*B_{C2},$$

wherein $B_{C1}$ and $B_{C2}$ are the first and the second channel bandwidth, respectively, and n and m are integers starting with 1.

Particularly the ratio n/m can be set to satisfy $n/m=2^i$, wherein i is a positive or negative integer value including zero.

A switch can be provided upwardly of a frequency converting block, wherein the switch is controlled by the control unit such that selectively either a signal in the first transmission frequency band or the second transmission frequency band is transmitted/received. The dual frequency band transceiver can furthermore comprise a baseband block and at least one antenna wherein the first frequency converting block is connected between the base band block and at least one antenna and is adapted to convert an intermediate frequency output of the baseband block or output by another frequency converting block, and a first transmission frequency band of the dual frequency band transceiver corresponds to the intermediate frequency and a second transmission frequency band obtained as an output signal of the first frequency converting block.

The control unit is adapted to control the switch together with the bandwidth used according to data link control (DLC) data.

The first transmission frequency band can be below 10 GHz and the second transmission frequency band can be higher than 10 GHz.

The first transmission frequency band can be between 5 and 6 GHz and the second transmission frequency band can be 24 GHz, 40 GHz, or 60 GHz.

The base band block is adapted to operate according to an OFDM modulation technique.

The subcarrier spacings of the OFDM system can be identical in the first transmission frequency band and the second transmission frequency band.

The subcarrier spacings of the OFDM system in the first transmission frequency band and the second transmission frequency band alternatively can satisfy the following equation:

$$\Delta F_1 / \Delta F_2 = k * 2^i,$$

wherein $\Delta F_1$ and $\Delta F_2$ are the subcarrier spacings used in the OFDM systems in the first transmission frequency band and the second transmission frequency band, respectively, and k is a positive integer value and i is a negative or positive integer value including zero.

This selection allows an effective implementation of the baseband block to process the OFDM signals and/or symbols.

Different antenna systems can be provided to be used, respectively, when the first or the second transmission frequency band is used.

The present invention furthermore relates to a dual band telecommunications device, such as for example a dualband cellular telephone, which comprises a transceiver as set forth above.

BRIEF SUMMARY OF THE INVENTION

According to the present invention furthermore a method for transceiving in two different transmission frequency band is provided. Thereby a switching between the first transmission frequency band and a second transmission frequency band is controlled. Correspondingly and simultaneously to the switching between the first transmission frequency band and the second transmission frequency band it can be changed between the first and the second channel bandwidth.

Further features, advantages and particularities of the present invention will come clearer from the following explanation of embodiments of the present invention taking in conjunction with the figures of the drawings.

BRIEF DESCRIPTION OF THE DRAWINGS

FIG. 3 shows a further example for the channel mapping according to the present invention, wherein the example according to FIG. 3 is particularly advantageous for an OFDM transmission system.

DETAILED DESCRIPTION OF THE INVENTION

Figure 1:
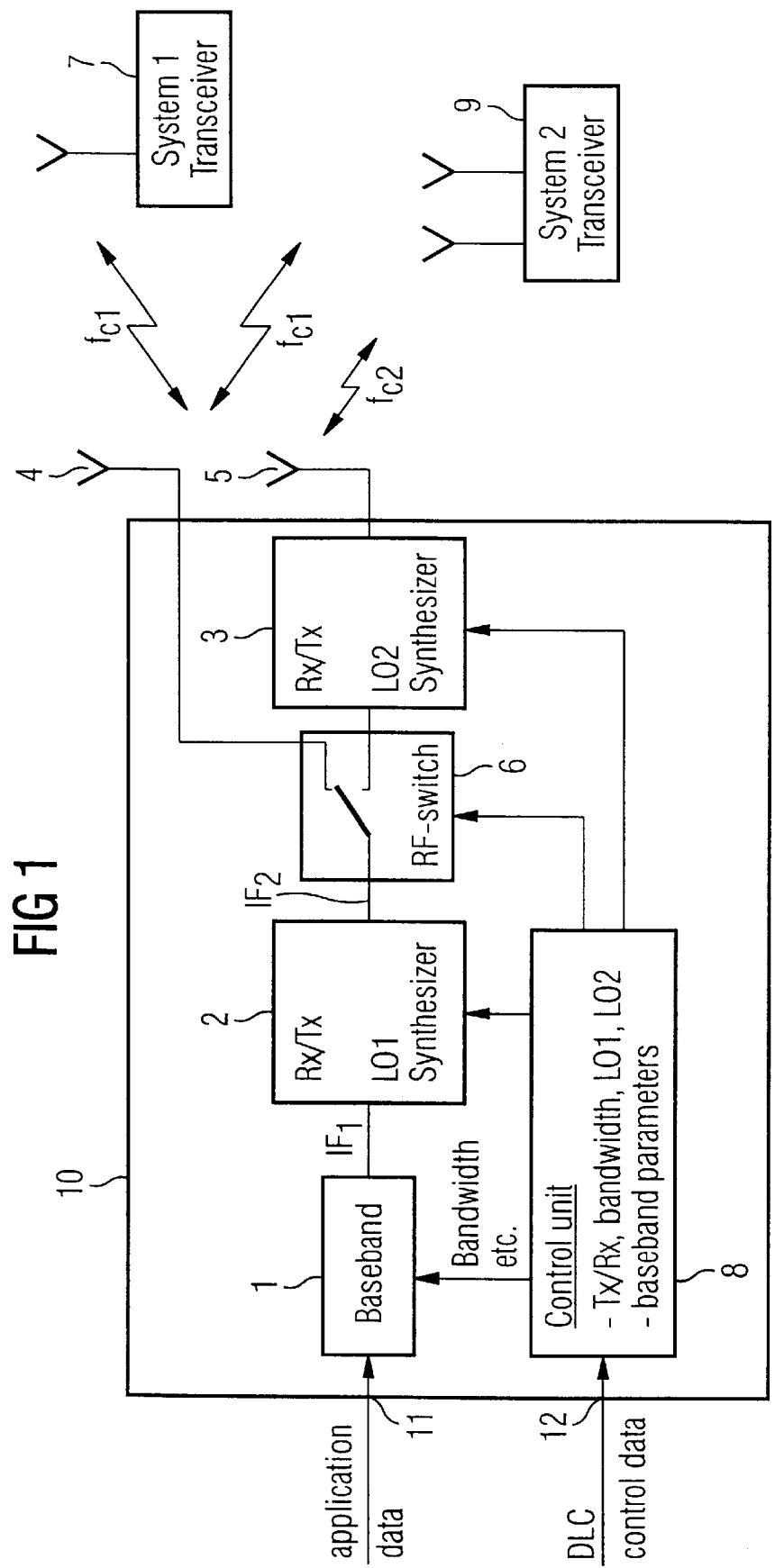
FIG. 1 shows the basic structure of a transceiver according to the present invention.

In FIG. 1, reference sign 10 designates a transceiver which can communicate wirelessly with another receiver 7 of a first system in a first transmission frequency band $f_{c1}$ and which is furthermore capable of communicating wirelessly with a transceiver 9 of another system 2 on the basis of a transmission frequency band $f_{c2}$ different to the first transmission frequency band $f_{c1}$ of system 1. The transceiver thereby is part of a telecommunications device, such as a dualband cellular telephone.

In the following the internal structure of the transceiver 10 will be explained.

Application data are input at a terminal 11 to a baseband block 1 of the transceiver 10. The data output by the baseband block 1 are supplied in a first intermediate frequency $IF_1$ to a frequency converting block 2 comprising a local oscillator LO1 frequency synthesizer. The data upconverted by the frequency converting block 2 on another second intermediate frequency $IF_2$ are passed to a RF switch 6. Depending on the switch position of the RF switch 6 the data upconverted on the RF frequency $IF_2$ are either passed to a first antenna system 4 or supplied to another frequency converting block 3 comprising a local oscillator L02 frequency synthesizer.

In case the switching position of a RF switch 6 is such that the signal on the RF frequency $IF_2$ is directly passed to the antenna 4, this signal is directly transmitted to the transceiver 7 of the system 1 and therefore the first transmission frequency band $f_{c1}$ corresponds to the second intermediate frequency $IF_2$.

In case the switching position of a RF switch 6 is such that the signal output by the frequency converting block 2 on the second intermediate frequency $IF_2$ is passed to the other frequency converting block 3, this signal is upconverted by the upconverting block 3 and passed to a second antenna system 5. The second upconverting block 3 thereby upconverts the input signal on the second transmission frequency band $f_{C2}$, which is adapted for a communication with the receiver 9 of the system 2. According to the embodiment shown in FIG. 1, therefore the first transmission frequency band $f_{C1}$ and the second transmission frequency band $f_{C2}$ are selected such that the first transmission frequency band $f_{C1}$ is an intermediate frequency $IF_2$ of the second transmission frequency band $f_{C2}$.

However, it is to be noted that according to another embodiment the cascade-like connection of the frequency converting blocks 2 and 3 connected with each other by means of the RF switch 6 can be replaced by a parallel structure of the frequency converting blocks, in which case a RF switch selects whether the data output by the baseband block (or by another frequency converting blocks) are passed to a frequency converting block adapted to upconvert the input data to the first transmission frequency band $f_{C1}$ or to another frequency converting block adapted to upconvert the input data to the second transmission frequency band $f_{C2}$.

As it is shown in FIG. 1, a control unit 8 is provided effecting the following control functions:

control of the baseband block (e.g. modulation parameters, etc.), switch control between reception operation Rx and transmission operation Tx, switching between the first and the second transmission frequency band, operation of the local oscillator LO1 and LO2 synthesizers, respectively, selection of the bandwidth used in the transmission frequency bands, and selection of baseband parameters.

It is to be noted that the present invention is particularly concerned with the selection of the bandwidth parameters by the control unit 8 issuing correspondingly bandwidth control information to the baseband block synchronously to the control of the operation of the local oscillator synthesizers and the switching between the first and the second transmission frequency band.

As is furthermore shown in FIG. 1, the control unit 8 is supplied at a input terminal 12 with DLC control data. DLC (data link control) corresponds to layer 2 and 3 of the OSI layer model for data communications. One sublayer of the data link control thereby is the so-called MAC (media access control). The DLC control data input at the terminal 12 of the control unit 8 to drive the above cited control functions are particularly data from said MAC layer.

As has been already been set forth above, the advantage of the transceiver 10 as shown in FIG. 1 is that the transmission frequency $f_{C1}$ operates at the same time as the intermediate frequency 4 $f_{C2}$ This allows the system to operate in two different frequency ranges with different propagation properties and thus fulfills a wide range of application requirements. In addition the structure allows interoperability between different systems (system 1 and system 2, for example), which are not only distinguished by its different transmission frequencies but also by its different channel bandwidth. To achieve the interoperability, the air interface channel of the system 1 has to be mapped properly to the air interface channel structure of the system 2.

Figure 2:
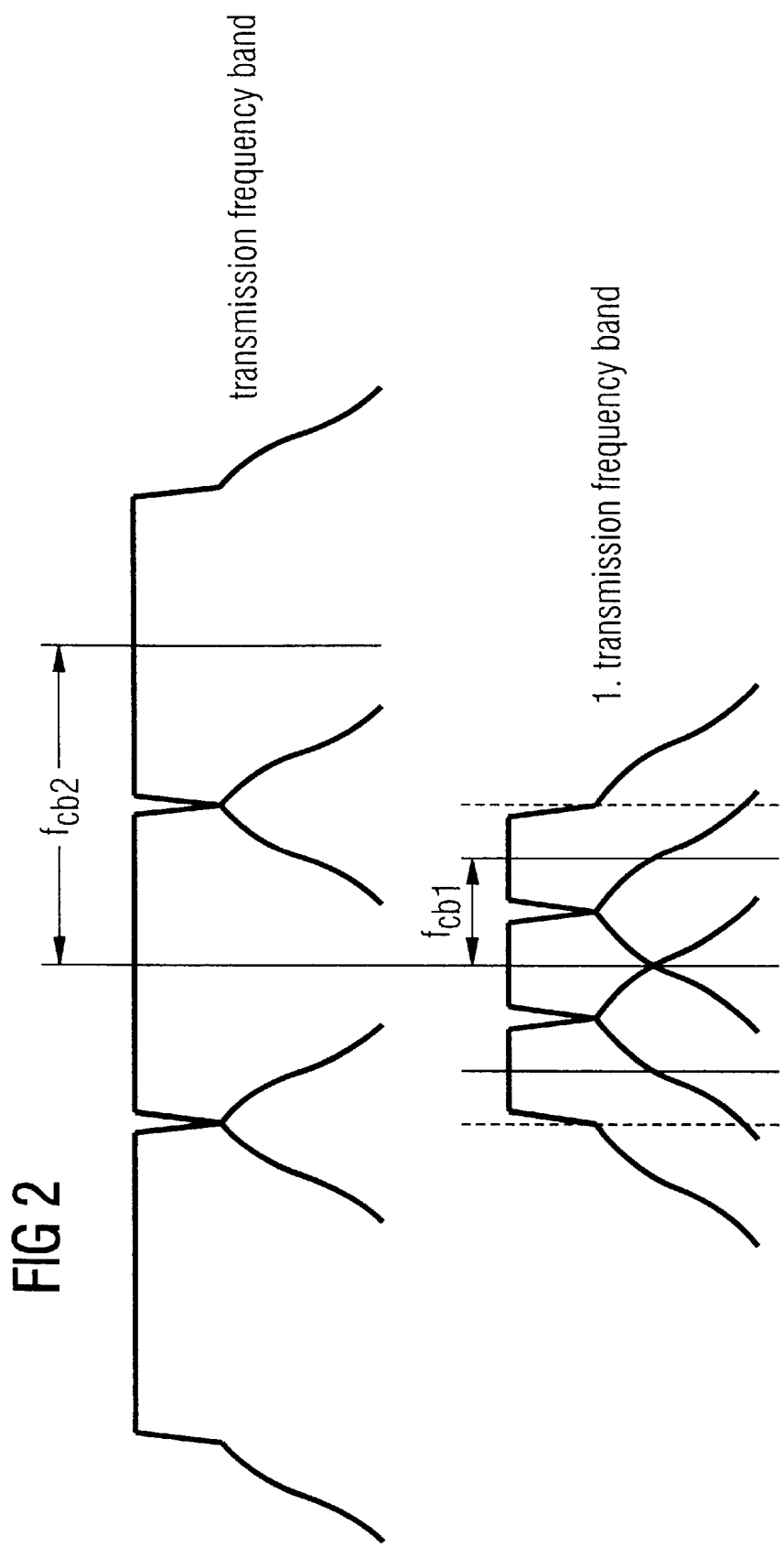
FIG. 2 shows an example for the mapping of channel bandwidths in two different transmission frequency bands.

FIG. 2 thereby shows a possible mapping. The actual mapping differs from system to system depending on the implemented technology and implementation limitations. In FIG. 2 showing a general channel mapping the system 2 channels (second transmission frequency band) are spaced by $f_{CH2}$ in the higher frequency range. The system 1 channels are spaced by $f_{CH1}$ in the lower frequency range.

As shown in FIG. 2, in order to facilitate the overall system integration and to achieve high reusability of system components (used for the different systems) the channel mapping in the baseband block 1 is set to satisfy the following equation:

$$n \times f_{CH1} = m \times f_{CH2},$$

wherein m and n are integer values starting with 1.

According to the present invention, a channel mapping solution particularly for an OFDM system is provided. Thereby a solution is proposed for an OFDM system transmitting a dual frequency band and providing interoperability with a coexisting OFDM system. The following system parameters thereby are taken into account:

total number of subcarriers: $N_1$, $N_2$ channel bandwidth: $B_{C1}$, $B_{C2}$, and subcarrier spacings: $\Delta F_1$, $\Delta F_2$ Between the above parameters the following relation exists:

$$\Delta F = \frac{B_C}{N}$$

According to the present invention $\Delta F_1$ can be equal to $\Delta F_2$, which means the same subcarrier spacing in both frequency ranges and/or systems is used.

Therefore $$\frac{B_{C1}}{N_1} = \frac{B_{C2}}{N_2} \text{ or } B_{C1} \times N_2 = B_{C2} \times N_1.$$

The above equations can be rewritten $$B_{C1} \times n = B_{C2} \times m \text{ and } N_1 \times n = N_2 \times m,$$

wherein the ration n/m satisfies the following equation:

$$n/m = k \times 2^i,$$

wherein k is a positive integer value and i is a negative or positive integer value including zero.

The above selection of the ratios n/m is particularly advantageous for the effective implementation of the FFT algorithm generating the OFDM symbols. In FIG. 3 the two OFDM systems channel mapping is depicted. In the example shown in FIG. 3 n=8 and m=1, which means ideally 8 channels of the OFDM system (system 1) operating in the lower frequency band can be mapped to one channel of the OFDM system (system 2) operating in the dual frequency bands. Depending on the required guard band ($F_{guard\ 2}$) between the channels in the upper frequency band the actual mapping of the system 1 channels could be limited to channel 2 through channel 7.

The same subcarrier spacings are kept for both systems and/or frequency bands, thereby giving the highest efficiency of interoperability. In general the ratio of $\Delta F_1/\Delta F_2$ is selected to satisfy the following equation:

$$\frac{\Delta F_1}{\Delta F_2} = k * 2^i,$$

wherein k is a positive integer value and i is a negative or positive integer value including zero.

This selection allows an effective implement of the baseband block to process the OFDM signals and/or symbols.

The following table shows system parameters of the dual band OFDM system according to an example.

|  | System 1 | System 2a | System 2b |
|---|---|---|---|
| Transmission frequency band | 5.15–5.35 GHz (200 MHz) | 59.36–60.64 GHz (1280 MHz) | 59.36–6064 GHz (1280 MHz) |
| Channel | 20 MHz | 160 MHz | 160 MHz |

|  | System 1 | System 2a | System 2b |
|---|---|---|---|
| bandwidth | | | |
| Channel spacing | 20 MHz | 160 MHz | 160 MHz |
| Total number of subcarriers | 64 | 512 | 256 |
| Subcarrier spacing | 312.5 kHz | 312.5 kHz | 625 kHz |
| Guard band between channels | 4 MHz | 32 MHz | 32 MHz |

What is claimed is:

1. A dual frequency band transceiver adapted to be operated in two different transmission frequency bands, comprising a control unit (8) controlling a switch (6) for changing between a first transmission frequency band ($f_{C1}$) and a second transmission frequency band ($f_{C2}$), wherein the control unit (8) is adapted to change between a first and a second channel bandwidth correspondingly to the switching between the first transmission frequency band ($f_{C1}$) and the second transmission frequency band ($f_{C2}$) and wherein the first and the second channel bandwidth satisfy the following equation:

$$n*B_{c1}=m*B_{c2},$$

in which $B_{c1}$ and $B_{c2}$ respectively represent the first and the second channel bandwidth, and n and m are integers starting with 1 which satisfy the equation $n/m=2^i$ in which i is a positive or negative integer.

2. The dual frequency band transceiver according to claim 1, wherein i>0.

3. The dual frequency band transceiver according to claim 1, characterized in that a switch (6) is provided upwardly of the first frequency converting block (3), wherein the switch (6) is controlled by the control unit (8) such that selectively either a signal in the first transmission frequency band ($f_{c1}$) or the second transmission frequency band ($f_{c2}$) is transmitted/received.

4. The dual frequency band transceiver according to claim 1, furthermore comprising:

a baseband block (1), at least a first frequency converting block (2, 3), and at least one antenna (4, 5), wherein the first frequency converting block (3) is connected between the baseband block (1) and at least one antenna (4, 5) and is adapted to convert an intermediate frequency (IF1, IF2) output of the baseband block (1) or output of another frequency converting block (2), and a first transmission frequency band ($f_{c1}$) of the dual band transceiver corresponds to the intermediate frequency (IF1, IF2) and a second transmission frequency band ($f_{c2}$) is obtained as an output signal of the first frequency converting block (2, 3).

5. The dual frequency band transceiver according to claim 4, characterized in that the control unit (8) is adapted to control the switch (6) together with the bandwidths used according to data link control data.

6. The dual frequency band transceiver according to claim 5, characterized in that the first transmission frequency band ($f_{c1}$) is between 5 and 6 GHz and the second transmission frequency band ($f_{c2}$) is 24 GHz, 40 GHz or 60 GHz.

7. The dual frequency band transceiver according to claim 1, characterized in that the first transmission frequency band ($f_{c1}$) is below 10 GHz and the second transmission frequency band ($f_{c2}$) is higher than 10 GHz.

8. The dual frequency band transceiver according to claim 1, characterized in that the baseband block (1) is adapted to operate according to an OFDM modulation technique.

9. The dual frequency band transceiver according to claim 8, characterized in that the subcarrier spacings of the OFDM system is identical in the first transmission frequency band ($f_{c1}$) and the second transmission frequency band ($f_{c2}$).

10. The dual frequency band transceiver according to claim 1, characterized in that different antenna systems (4, 5) are provided to be used respectively when the first or the second transmission frequency band ($f_{c1}$, $f_{c2}$) is used.

11. The dual frequency band transceiver according to claim 1, characterized in that the first and the second transmission frequency band ($f_{c1}$, $f_{c2}$) are selected such that the spectral efficiency of the second transmission frequency band is higher than the spectral efficiency of the first transmission frequency band.

12. A dual band telecommunications device, characterized in that the device comprises a transceiver according to claim 1.

13. A method for transceiving in two different transmission frequency bands, comprising the following steps:

controlling (8) a switching (6) between a first transmission frequency band ($f_{c1}$) and a second transmission frequency band ($f_{c2}$), and changing between a first and a second channel bandwidth correspondingly to the switching between the first transmission frequency band ($f_{c1}$) and the second transmission frequency band ($f_{c2}$) wherein the first and the second channel bandwidth satisfy the following equation: $n*B_{c1}=m*B_{c2}$ wherein $B_{c1}$ and $B_{c2}$ are the first and the second channel bandwidth, respectively, and n and m are integers starting with 1 which satisfy the equation $n/m=2^i$ in which i is a positive or negative integer.

14. The method according to claim 13, characterized by the step of controlling local oscillator synthesizers to tune to a predetermined channel of the corresponding transmission frequency band.

15. The method according to claim 13, wherein i>0.

16. The method according to claim 13, characterized in that the first transmission frequency band ($f_{c1}$) is below 10 GHz and the second transmission frequency band ($f_{c2}$) is higher than 10 GHz.

17. The method according to claim 16, characterized in that the first transmission frequency band ($f_{c1}$) is between 5 and 6 GHz and the second transmission frequency band ($f_{c2}$) is in a range of 24 GHz, 40 GHz or 60 GHz.

18. The method according to claim 13, characterized in that the transceiving is effected according to an OFDM modulation technique.

19. The method according to claim 18, characterized in that the subcarrier spacings of the OFDM system are identical in the first transmission frequency band ($f_{c1}$) and the second transmission frequency band ($f_{c2}$).

* * * * *